United States Patent Office 3,652,522
Patented Mar. 28, 1972

3,652,522
PROCESS FOR THE POLYMERIZATION OF
VINYL CHLORIDE
Sergio Lo Monaco and Corrado Mazzolini, Mestre, Luigi
Patron, Sestriere, and Alberto Moretti, Venezia, Italy,
assignors to Chatillon Societa Anonima Italiana per le
Fibre Tessili Artificiali S.p.A., Milan, Italy
No Drawing. Filed Dec. 16, 1968, Ser. No. 784,191
Claims priority, application Italy, Dec. 19, 1967,
24,081/67
Int. Cl. C08f 1/62, 1/04, 3/30
U.S. Cl. 260—87.5 R
16 Claims

ABSTRACT OF THE DISCLOSURE

A low-temperature bulk polymerization process for vinyl chloride is disclosed wherein the polymerization is carried out in the presence of a combined catalyst system consisting of an organic hydroperoxide and a salt of a monoester of sulphurous acid.

---

Vinyl chloride is polymerized (or, with an ethylenically unsaturated monomer copolymerizable therewith, is copolymerized) by a low-temperature bulk-polymerization technique employing as the catalyst system an organic hydroperoxide and a salt of a mono-ester of sulphurous acid having the general formula

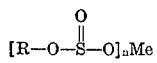

where R is an alkyl-, cyclo-alkyl- or aryl radical having from 1 to 12 carbon atoms, Me is a metal of the first and second groups of the Periodic System or aluminum, and $n$ is 1, 2 or 3 depending on the valency of Me.

It is known that the chemical-physical properties of polyvinyl chloride depend on the temperature at which the polymerization is conducted, in the sense that such properties steadily improve to lower the temperature at which the polymerization is conducted. As a matter of fact, it has been found that when effecting the polymerization of vinyl chloride at a low temperature, polymers are obtained which have some particularly desirable characteristics, such as a higher percentage of crystallinity associated with a high index of syndiotacticity, a higher glass transition temperature, a higher softening temperature, etc.

Such a polyvinyl chloride, usually called highly syndiotactic polyvinyl chloride, is particularly suited for being transformed into fibers having excellent physical, mechanical and chemical characteristics, and in particular an excellent dimensional stability both in boiling water as well as in the solvents used in dry-cleaning, within the temperature ranges encountered in the practical use of those solvents.

However, the low-temperature polymerization of vinyl chloride, as a practical matter, involves serious difficulties as far as the polymerization process and the catalyst are concerned.

In fact, the only polymerization process that can be easily carried out at a low temperature is the bulk-polymerization as the other known polymerization processes, that is, the emulsion- and solution-polymerizations, involve many inconveniences of a practical nature such as for instance the choice of a suitable solvent or emulsifying agent, the necessity to use bulky equipment and great volumes of reacting compounds in order to obtain industrially interesting yield, high costs for bringing the polymerization mixture down to a low temperature, etc.

As to the catalyst, the usual polymerization initiators, such as organic peroxides, azo-bis-isobutyronitrile, per- sulphates or the Redox catalysts in which persulphates or peroxides associated with a reducing agent such as $SO_2$, sodium sulphite or hydrazine etc. are used, are all ineffective in the low-temperature polymerization of vinyl chloride, because they are stable at such temperatures and do not produce the free radicals required to start the polymerization.

It is known that the Redox catalytic system, consisting of an organic hydroperoxide and sulphur dioxide, at a low temperature, gives rise to free radicals capable of starting the copolymerization of the olefinic compounds with the sulphur dioxide. It has, however, been proved that in practice the above cited Redox catalytic system is quite ineffective in the low-temperature bulk-polymerization of vinyl chloride. In fact, it has been experimentally proved that when vinyl chloride monomer is used as a reaction medium, the sulphur dioxide catalyzes the acid decomposition of the hydroperoxide without the formation of free radicals. Thus, for instance, cumene hydroperoxide in monomeric vinyl chloride, at −30° C. is quantitatively and nearly immediately decomposed to acetone and phenol, while the sulphur dioxide remains unaltered.

The only catalysts that, so far, have proved efficient in starting the low-temperature polymerization of vinyl chloride are the organo-metal compounds such as alkyl zinc, alkyl cadmium, alkyl aluminum, alkyl boron, etc. in association with oxygen or with an oxidizing substance.

In practice, however, the use of such catalysts has been found to be more difficult, owing to their self-inflammability when coming into contact with air, as well as the difficulty in preparing them and their poor stability, and also because the presence of even the slightest traces of oxygen during the polymerization with said catalysts causes great variations in the polymerization conversion and in the degree of polymerization of the polymer itself.

Furthermore, the decomposition products of such catalysts, at room temperature or at higher temperature, prove to be still excellent polymerization initiators, and therefore the recovered unreacted monomers, containing the decomposition products of said catalysts, tend to polymerize during their recovery and storage. Thus, the problem arises of completely eliminating from the unreacted monomers such decomposition products.

It has now, surprisingly, been found that it is possible to low-temperature bulk-polymerize vinyl chloride, without any of the above-mentioned drawbacks arising, by using a Redox catalytic system constituted by an organic hydroperoxide and a salt of a mono-ester of sulphurous acid of the general formula:

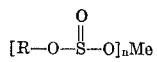

wherein R is an alkyl-, cycloalkyl- or aryl-radical having from 1 to 12 carbon atoms, Me is a metal of the first or second group of the Periodic System or aluminum, and $n$ is 1, 2 or 3 depending on the valence of Me.

By the term "organic hydroperoxide' is meant an organic compound having the general formula:

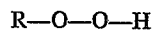

wherein R may be a linear or branched chain alkyl radical, a cycloalkyl radical, an aryl radical or an arylalkyl radical.

Examples of organic compounds of the general formula R—O—O—H which may be conveniently used in the process of this invention are: methyl-, ethyl-, n-propyl-, ter.butyl-, n-butyl-, amyl-, hexyl-, octyl-, etc. hydroperoxide; phenyl-ethyl hydroperoxide; phenyl-isobutyl-hydroperoxide; phenyl-isopropyl-hydroperoxide; etc. Particularly advantageous results are attained by using cumene hydroperoxide or tertiary-butyl-hydroperoxide.

It must be expressly pointed out that a distinct from the hydroperoxides, the organic peroxides of the general formula R—O—O—R are ineffective in the process of this inveniton.

The concentration of the oragnic hydroperoxide is not critical and generally may vary between 0.01 and 3% with respect to the starting monomers. Concentrations of hydroperoxide between 0.02% and 0.2% are preferred. Concentrations here and elsewhere in this specification are by weight unless otherwise specified.

There are many sulphur compounds of the general formula:

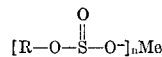

as above defined, which may be conveniently used as activator-reducing agents for the organic hydroperoxide.

The only condition to be satisfied by such salts of the mono-esters of the sulphurous acid is that the sulphur atom shall be easily oxidized by the organic hydroperoxide. The salts of the mono-esters of the sulphurous acid may be chosen from amongst-sodium methyl-sulphate, potassium methyl-sulphite, lithium methyl-sulphite, magnesium methyl-sulphite, aluminum methyl-sulphite, sodium ethyl-sulphite, potassium ethyl-sulphite, lithium ethyl sulphite, magnesium ethyl-sulphite, sodium n-propyl-sulphite, magnesium n-propyl-sulphite, potassium n-propyl-sulphite, etc., sodium iso-propyl-sulphite, magnesium iso-propyl-sulphite, potassium iso-propyl-sulphite, etc., sodium butyl-sulphite, magnesium butyl-sulphite, potassium butyl-sulphite, etc., sodium terbutyl-sulphite, potassium ter.butyl-sulphite, sodium n-amyl-sulphite, potassium n-amyl-sulphite, sodium cyclo-hexyl-sulphite, sodium cyclo-pentyl-sulphite, sodium phenyl-sulphite, sodium benzyl-sulphite, sodium phenyl-ethyl-sulphite, etc.

Amongst those sulphur compounds, those in which R is an alkyl radical having from 1 to 4 carbon atoms and in which Me is sodium, potassium or magnesium, have proven to be particularly effective.

It must be expressly pointed out that it has been experimentally ascertained that the di-esters of sulphurous acid having the general formula:

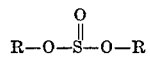

in which R has the above defined meaning, are ineffective for starting, together with the hydroperoxides, the low-temperature bulk-polymerization of vinyl chloride.

The concentration of the salts of the mono-esters of sulphurous acid generally varies from 0.01% to about 2% with respect to the monomers present. Concentrations between 0.035 and 0.5% are particularly preferred. Concentrations greater than 2% by weight may also be used, but, practically, it is preferred to operate with concentrations lower than 2%, inasmuch as concentrations exceeding such a limit involve very high polymerization rates, which in the bulk-polymerization give rise to several drawbcaks, mainly with regard to exchange of the heat of polymerization.

Practically, best results are obtained when the molar ratio organic hydroperoxide R—O—SO$_2$— is smaller than 1.

The salts of the mono-esters of sulphurous acid may be added to the reaction medium either as such or, better still, dissolved in an inert organic solvent. The best solvents for this purpose have proved to be the aliphatic alcohols having from 1 to 5 carbons atoms, and among these methyl alcohol and ethyl alcohol are preferred. The nature and quantity of such solvents do not have any influence on the course of polymerization, even if, for economic reasons, concentrated solutions are preferred.

By "low-temperautre" is meant a temperature lower than 0° C., and preferably a temperature between —10° C. and —70° C. Such a temperature of the reaction mixture is brought about and controlled by conventional means, such as for instance, by immersing the reactor into a thermostatically controlled bath containing cooled trichloroethylene or cooled acetone.

By the term "bulk polymerization" as used in the present description, it must be understood not only the polymerization carried out by the catalytic system in the undiluted monomer, but also in the presence of a minor amount of non-reacting organic compounds, liquid at the polymerization temperature, having a fluidizing action on the polymerization mass, to render this latter more easily stirrable and for facilitating heat exchange through the walls of the polymerization vessel.

As fluidizing agents the following substances may be used: aliphatic hydrocarbons, aryl-hydrocarbons, cyclo-aliphatic hydrocarbons, unsaturated halogenated hydrocarbons, alkyl-mercaptans, etc. Amongst these compounds the alkyl mercaptans having from 1 to 15 carbon atoms are preferred, and particularly those having from 4 to 8 carbon atoms give the best results. Such mercaptans, besides acting as fluidizers, are also excellent chain-regulators, allowing one therefore to obtain polymers having a controlled or predetermined viscosity.

It is advisable to conduct the polymerization in the absence of oxygen which has an inhibiting effect on the polymerization. In general, for this purpose, suitable inert gases such as nitrogen are used to displace the air from the polymerization reactor.

The bulk-polymerization, in practice, may be carried out in a continuous, semi-continuous or batchwise mode of operation. In every instance, however, the constituents of the catalytic system must be kept separated from each other until their introduction into the monomeric system in the polymerization reactor.

The polymerization may be short-stopped at the desired degree of polymerization, that is, at the desired monomer conversion and at the attainment of the desired molecular weight, by treating the reaction mass with an aqueous or alcoholic solution of a hydroxylamine salt, preferably hydroxylamine chlorohydrate or sulphate. In the case of a continuous polymerization process, the solution of the hydroxylamine salt may be added either in the overflow pipe or in the container tank or in the tank wherein is carried out the separation and recovery of the components of the reaction mixture.

The polyvinyl chloride obtained according to the process of the present invention shows a high degree of syndiotacticity, a homogeneous molecular weight, and furthermore possesses a high degree of whiteness and an excellent heat-stability. Thanks to these particular properties this polyvinyl chloride is particularly suited for being transformed into fibers, films, filaments, etc., which show excellent physical, chemical and mechanical properties.

It is to be understood that the catalytic system used in the process of the present invention may also be applied advantageously for preparing copolymers of vinyl chloride containing up to 50% by weight of at least one other ethylenically unsaturated monomer co-polymerizable with vinyl chloride. The only difference with respect to the above described process is that in that case the starting monomers shall be a mixture of vinyl chloride with one or more ethylenically unsaturated monomers copolymerizable with the vinyl chloride.

By the term "ethylenically unsaturated monomers" reference is meant to all organic compounds that contain the group C=C. Examples of such compounds are: vinyl and vinylidene compounds such as vinylidene fluoride or chloride, vinyl fluoride; vinyl esters of carboxylic aliphatic acids containing from 2 to 18 carbon atoms, such as for instance: vinyl esters of acetic acid, of propionic acid, etc.; monomers of the acrylic type, such as acrylic acid, methacrylic acid or their derivatives, such as acrylonitrile, acrylates or methacrylates of aliphatic alcohols containing from 1 to 12 carbon atoms, etc.

In order still better to illustrate the present invention, the following specific examples are given:

EXAMPLE 1

Into a glass polymerization reactor of 2 liters capacity fitted with a stirrer, a thermometer and a cooling system, are continuously fed in:

1000 g./hr. of vinyl chloride;
an organic hydroperoxide of the type and in quantities as reported in the following Table I;
a salt of a mono-ester of sulphurous acid of the type and in quantities recorded on the following Table I.

The polymerization reactor is maintained at a temperature of −30° C. by means of a thermostatically controlled bath.

The suspension of the polymer thus obtained is discharged through an overflow pipe into an aqueous solution of hydroxylamine chlorohydrate maintained at a pH of 6 by the addition of sodium bicarbonate. The polymer is separated by centrifugation and is washed with methanol and ethyl ether and then dried.

Table I records:
(1) The type and the feed rate of hydroperoxide in g./hr.
(2) The type and the feed rate of the salt of the monoester of sulphurous acid in g./hr.
(3) The contact time of the reacting monomers with the catalytic system (DT), expressed by the ratio between the reactor volume and the feed rate of the monomers.
(4) The intrinsic viscosity [$\eta$] of the polymer, determined in cyclohexanone at 30° C. and expressed in dl./g.
(5) The conversion expressed in percentage with reference to the monomers.
(6) The original color of the polymer, determined by means of a General Electric Integrator Spectrophotometer according to the C.I.E. system of representation and measurement of the color. According to such a system the color is expressed in terms of purity index (PI) and brightness (B) referred to Standard illumination.
(7) The thermal stability or heat sensitivity expressed by the variation of the purity index ($\Delta$PI) and by the variation of the brightness ($\Delta$B) of the polymer after heating in a forced air oven at 110° C. for 1 hour.
(8) The syndiotacticity index (SI) determined on the basis of the ratio between the absorption coefficients of the infrared bands D 635 cm.$^{-1}$ D 693 cm.$^{-1}$, as described by Fordham, Burleigh and Sturn, in J. Polymer Science, vol. XLI, pages 73–82 (1959).
(9) The glass transition temperature (Tg) determined according to the method described in the Journal of Polymer Science, vol. 56 (1962), pages 225–231.

If the tests 1 and 2 are repeated by feeding 1.5 g. of benzoyl peroxide instead of (respectively) cumene hydroperoxide or tert.butyl hydroperoxide, no polymerization will be noticed.

EXAMPLE 2

This example is given for comparative purposes to show the inactivity of the di-esters of sulphurous acid as activator-reducing agents in the low-temperature bulk-polymerization of the vinyl chloride in which as catalyst an organic hydroperoxide is used.

Into a polymerization reactor of 2 liters capacity maintained at −30° C., are introduced:

1,500 g. of vinyl chloride,
1.5 g. of cumene hydroperoxide,
2.2 g. of dimethyl-sulphite.

After 24 hours no polymerization is noticed.

Upon replacing the dimethyl-sulphite with di-butylsulphite or with di-isopropyl-sulphite, no polymerization is observed.

EXAMPLE 3

Into a polymerization reactor of 2 liters capacity containing 2,000 g. of vinyl chloride, pre-cooled to −15° C. and maintained at that temperature by means of a thermostatically controlled bath, are fed, during 2 hours, the following substances:

3 g. of sodium mono-methyl-sulphite in a 10% ethanol solution.
3.8 g. of cumene hydroperoxide.

After completion of the feeding, the reactor is cooled down and kept with stirring in a nitrogen atmosphere for 2 hours. Thereupon the reaction mass is discharged and the polymer is recovered by filtering. The polymer thus obtained is then washed with methanol and then dried for 12 hours in an oven at 50° C. under vacuum.

300 g. of polymer (conversion=15%) are thus obtained, having the following characteristics:

Intrinsic viscosity [$\eta$]=1.1 dl./g.
Syndiotacticity index (SI): 1.8
Tg: 99° C.

On repeating the test, by operating at a temperature of −50° C., the following results are obtained:

Conversion: 4.8%
Intrinsic visocitcy [$\eta$]: 0.99 dl./g.
Syndiotactivity index (SI): 2.5
Tg: 109° C.

EXAMPLE 4

Example 1 is repeated by continuously feeding in:
500 g./hr. of vinyl chloride,

| Test | Hydroperoxide | G./hr. | Sulphur compound* | G./hr. | DT min. | Conversion percent | [$\eta$] | Original color PI | B | Sensitivity to heat $\Delta$PI | $\Delta$B | Tg °C. | IS |
|---|---|---|---|---|---|---|---|---|---|---|---|---|---|
| 1 | Cumene hydroperoxide | 1 | Sodium methyl-sulphite | 1.75 | 120 | 11 | 1.6 | 98.6 | 93.3 | 3.5 | 15 | 105 | 2.1 |
| 2 | Tert.butyl-hydroperoxide | 0.59 | ___do___ | 1.75 | 120 | 10 | 1.7 | 99 | 94 | 4 | 13 | 105 | 2.05 |
| 3 | Cumene hydroperoxide | 1 | Magnesium ethyl-sulphite | 2 | 120 | 10.2 | 1.5 | 99.3 | 95.6 | 3 | 10.2 | 105 | 2.1 |
| 4 | ___do___ | 1 | Magnesium methyl-sulphite | 0.57 | 120 | 9 | 1.3 | 99.1 | 94.8 | 3.2 | 10.1 | 105 | 2.1 |
| 5 | ___do___ | 1 | Sodium tert.butyl-sulphite | 1.05 | 120 | 8 | 1.25 | 98.3 | 91.9 | 4.5 | 14 | 104 | 2.05 |
| 6 | Tert.butyl-hydroperoxide | 0.6 | ___do___ | 1.6 | 120 | 9.5 | 1.35 | 98.7 | 92.5 | 4 | 13 | 105 | 2.1 |
| 7 | Cumene hydroperoxide | 1.5 | Aluminum methyl-sulphite | 1.2 | 120 | 10.5 | 1.5 | 97.8 | 91.2 | 5.1 | 16 | 104.5 | 2.0 |
| 8 | Tert.butyl hydroperoxide | 1 | Potassium methyl-sulphite | 3 | 120 | 12 | 1.05 | 98.5 | 94 | 4 | 12.5 | 105 | 2.1 |
| 9 | Cumene hydroperoxide | 1 | Sodium benzyl-sulpite | 4 | 120 | 9.2 | 1.42 | 98.6 | 93.8 | 4.2 | 11.8 | 103 | 2.1 |

* The sulphur compounds are fed in the form of a 10% by weight methanol solution.

0.3 g./hr. of tert.butyl-hydroperoxide,
0.87 g./hr. of sodium methyl-sulphite in a 12% methanol solution,
0.05 g./hr. of n-butyl-mercaptan The polymerization conversion amounts to 11.2% and the polymer obtained shows the following characteristics:
Intrinsic viscosity: 1.05 dl./g.
Color:
 PI: 99
 B: 94.8
Heat-sensitivity:
 ΔPI: 3
 ΔB: 11
Syndiotactivity index: 2.08
Tg: 102.5° C.

EXAMPLE 5

Into a polymerization reactor of 2 liters capacity containing 2,000 g. of vinyl chloride, pre-cooled to −50° C. and maintained at this temperature by means of a thermostatically controlled bath, during 2 hours, there are fed the following substances:
40 g. of cumene hydroperoxide,
40 g. of sodium mono-methyl sulphite in a 10% methanol solution.
Subsequently the procedure follows that of Example 3.

The polymerization conversion turns out to be 22% and the polymer thus obtained shows the following characteristics:
Intrinsic viscosity: 1.10 dl./g.
Syndiotactivity index (SI): 2.4
Tg: 108° C.

EXAMPLE 6

By operating according to Example 1, into a polymerization reaction of 2,690 cc. capacity, the following substances are fed:
1,345 g./hr. of vinyl chloride
13.45 g./hr. of methyl methacrylate
1.345 g./hr. of cumene hydroperoxide
2.4 g./hr. of magnesium mono-methyl-sulphite in a 10% methanol solution.

The polymerization conversion amounts to 8.50% and the copolymer thus obtained contains a quantity of copolymerized methyl-methacrylate of 7.0% and the intrinsic viscosity amounts to 1.20 dl/g.

EXAMPLE 7

Example 6 is repeated by feeding in as the monomers: 1,345 g./hr. of vinyl chloride and 40.35 g./hr. of vinyl acetate. The polymerization conversion attained is 3.00% and the copolymer obtained contains a quantity of copolymerized vinyl acetate of 3% and its intrinsic viscosity is 1.00 dl./g.

What is claimed is:
1. In a process for bulk-polymerizing vinyl chloride at a temperature from below 0° C. to −70° C., the improvement comprising carrying out the polymerization in the presence of a catalytic system comprising
(a) an organic hydroperoxide, said organic hydroperoxide being present in a concentration between 0.01 to 3% by weight based upon the starting monomeric material, and
(b) a salt of a monoester of sulphurous acid of the formula

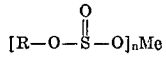

wherein R is an alkyl, cycloalkyl or aryl radical having from 1 to 12 carbon atoms, Me is a metal of the first and second groups of the Periodic System or aluminum and n is 1, 2 or 3 depending upon the valency of Me, said salt of a monoester of sulphurous acid being present in a concentration between 0.1 and 2% by weight based upon the starting monomeric material.

2. A process according to claim 1, wherein the concentration of organic hydroperoxide varies from 0.02% to 0.2% by weight with respect to the starting monomeric material.

3. A process according to claim 1, wherein the concentration of the salt of mono-ester of sulphurous acid is between 0.035% and 0.5% by weight with respect to the starting monomeric material.

4. A process according to claim 1, wherein the molar ratio organic hydroperoxide R—O—SO$_2$— is less than 1.

5. A process according to claim 1, wherein the salt of mono-ester of sulphurous acid is fed in solution in an aliphatic alcohol having from 1 to 5 carbon atoms.

6. A process according to claim 5, wherein the aliphatic alcohol is methyl alcohol or ethyl alcohol.

7. A process according to claim 1, wherein as organic hydroperoxide cumene hydroperoxide or tert.butyl-hydroperoxide is used.

8. A process according to claim 1, wherein as salts of mono-esters of sulphurous acid having the general formula:

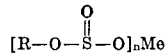

there are used those in which R is an alkyl radical having from 1 to 4 carbon atoms, Me is sodium, potassium or magnesium, and n is 1 or 2 depending on the valency of Me.

9. A process according to claim 1, wherein the polymerization is carried out at a temperature lower than 0° C.

10. A process according to claim 9, wherein the temperature is between −10° C. and −70° C.

11. A process according to claim 1, wherein the polymerization is carried out in the presence of fluidizing agents.

12. A process according to claim 11, wherein the fluidizing agent is an alkylmercaptan having from 1 to 15 carbon atoms.

13. A process according to claim 11, wherein the fluidizing agent is an alkylmercaptan having from 4 to 8 carbon atoms.

14. A process according to claim 1, wherein the polymerization is short-stopped at the desired level by treating the reaction mass with a solution of a hydroxylamine salt.

15. A process according to claim 14, wherein the hydroxylamine salt is hydroxylamine hydrochloride or hydroxylamine sulphate.

16. A process according to claim 1, wherein the vinyl chloride is copolymerized with up to 50% by weight of at least one other ethylenically unsaturated copolymerizable monomer.

References Cited

Furukawa, J. et al., Catalytic Reactivity of Organometallic Compounds for Olefin Polymerization II. Vinyl Chloride Polymerization Catalyzed by Binary Systems Involving Organometallic Compounds. In Journal of Polymer Science. Vol. XL pp. 237–246 (1959).

JOSEPH L. SCHOFER, Primary Examiner

J. A. DONAHUE, JR., Assistant Examiner

U.S. Cl. X.R.

260—86.3, 87.1, 87.5 A, 87.7, 92.8